United States Patent [19]

Visser

[11] Patent Number: 5,469,923
[45] Date of Patent: Nov. 28, 1995

[54] DEVICE FOR EXTRACTING A PLANT FROM THE GROUND

[75] Inventor: Alexis W. Visser, Sunninghill, South Africa

[73] Assignee: Desmond Kleineibst, Transvaal, South Africa; a part interest

[21] Appl. No.: 175,574

[22] Filed: Dec. 30, 1993

[30] Foreign Application Priority Data

Dec. 30, 1992 [ZA] South Africa .................. 92/10090
Jun. 24, 1993 [ZA] South Africa .................. 93/4537

[51] Int. Cl.⁶ .............................. A01B 45/02; A01C 11/02
[52] U.S. Cl. .............................. 172/22; 172/378; 111/106
[58] Field of Search .............................. 172/21, 22, 371, 172/378; 175/403, 20, 19; 30/301, DIG. 7, 396, 353, 355, 357; 111/106; 294/50.5, 49; 56/239

[56] References Cited

U.S. PATENT DOCUMENTS

| | | |
|---|---|---|
| 1,647,832 | 11/1927 | Kovar . |
| 1,931,773 | 10/1933 | Sobol ................................. 294/55.5 |
| 2,030,770 | 2/1936 | Smith . |
| 2,300,813 | 11/1942 | Savage ................................. 175/403 |
| 2,402,550 | 6/1946 | Hiack . |
| 3,123,391 | 3/1964 | Novak ................................. 172/22 |
| 3,198,719 | 8/1965 | Stewart ................................. 172/378 |
| 3,273,930 | 9/1966 | Gottfried ................................. 172/22 |
| 3,444,938 | 5/1969 | Ballmann ................................. 172/22 |
| 3,506,296 | 4/1970 | Nelson . |
| 3,828,473 | 8/1974 | Morey ................................. 111/106 |
| 3,909,054 | 9/1975 | Lazzari et al. . |
| 3,918,757 | 11/1975 | Huber . |
| 3,985,382 | 10/1976 | Wheeler . |
| 4,147,329 | 4/1979 | Rodriguez . |
| 4,157,198 | 6/1979 | McDaniels . |
| 4,290,374 | 9/1981 | Maples ................................. 111/92 |
| 4,319,642 | 3/1982 | Merz . |
| 4,323,019 | 4/1982 | Haddock . |

(List continued on next page.)

FOREIGN PATENT DOCUMENTS

| | | |
|---|---|---|
| 6034493 | 10/1987 | Australia . |
| 531725 | 10/1953 | Belgium . |
| 2045417 | 4/1992 | Canada . |
| 515202 | 5/1992 | European Pat. Off. . |
| 2631511 | 5/1988 | France . |
| 2647625 | 12/1990 | France . |
| 200126 | 7/1908 | Germany . |
| 3340871 | 11/1983 | Germany . |
| 3601595 | 1/1986 | Germany . |
| 3919375 | 6/1989 | Germany . |
| 4017324 | 5/1990 | Germany . |
| 4115871 | 5/1991 | Germany . |
| 8807865 | 10/1988 | South Africa . |
| 670353 | 8/1985 | Switzerland . |
| 0436631 | 4/1975 | U.S.S.R. . |
| 0694110 | 3/1977 | U.S.S.R. . |
| 0703056 | 4/1977 | U.S.S.R. . |
| 0906400 | 2/1980 | U.S.S.R. . |
| 0933006 | 6/1980 | U.S.S.R. . |
| 0886787 | 7/1980 | U.S.S.R. . |
| 1047408 | 5/1982 | U.S.S.R. . |
| 1565367 | 2/1988 | U.S.S.R. . |
| 1736360 | 3/1989 | U.S.S.R. . |
| 1667656 | 4/1989 | U.S.S.R. . |
| 1704662 | 11/1989 | U.S.S.R. . |
| 1600826 | 10/1981 | United Kingdom . |
| 2094601 | 9/1982 | United Kingdom . |
| 2119211 | 11/1983 | United Kingdom . |
| 2192772 | 6/1986 | United Kingdom . |
| 2240021 | 10/1989 | United Kingdom . |
| 9006048 | 11/1988 | WIPO . |

*Primary Examiner*—Randolph A. Reese
*Assistant Examiner*—Spencer Warnick

[57] ABSTRACT

The present invention relates to a device for extracting a plant, such as a weed, from the ground. The device has at least two opposed prongs, each prong tapering operatively downwardly. The tapered prongs are shaped and configured with respect to one another to in use pierce the ground and grip a plug of earth in which the plant is located between the tapered prongs. The device also has handle for moving the tapered prongs relative to the ground.

6 Claims, 1 Drawing Sheet

U.S. PATENT DOCUMENTS

| | | |
|---|---|---|
| 4,326,743 | 4/1982 | Tamura . |
| 4,473,248 | 9/1984 | Preradovich . |
| 4,603,744 | 8/1986 | Ramirez . |
| 4,630,366 | 12/1986 | Fry . |
| 4,641,712 | 2/1987 | Cravotta . |
| 4,689,885 | 9/1987 | Albanese .................................. 30/301 |
| 4,715,634 | 12/1987 | Mueller et al. . |
| 4,759,128 | 7/1988 | Katoh et al. . |
| 4,779,685 | 10/1988 | Combs . |
| 4,779,913 | 10/1988 | Henry . |
| 4,815,778 | 3/1989 | Hoch . |
| 4,819,735 | 4/1989 | Puckett ...................................... 172/22 |
| 4,819,736 | 4/1989 | Hedgepeth . |
| 4,832,132 | 5/1989 | Barcelon . |
| 4,901,801 | 2/1990 | Popivalo . |
| 5,005,888 | 4/1991 | Parks et al. . |
| 5,060,997 | 10/1991 | Plecki . |
| 5,156,101 | 10/1992 | Wien . |
| 5,242,024 | 9/1993 | Van Houten ............................. 172/22 |
| 5,322,133 | 6/1994 | Hart ........................................ 175/20 |
| 5,338,078 | 8/1994 | Basek ...................................... 172/22 |

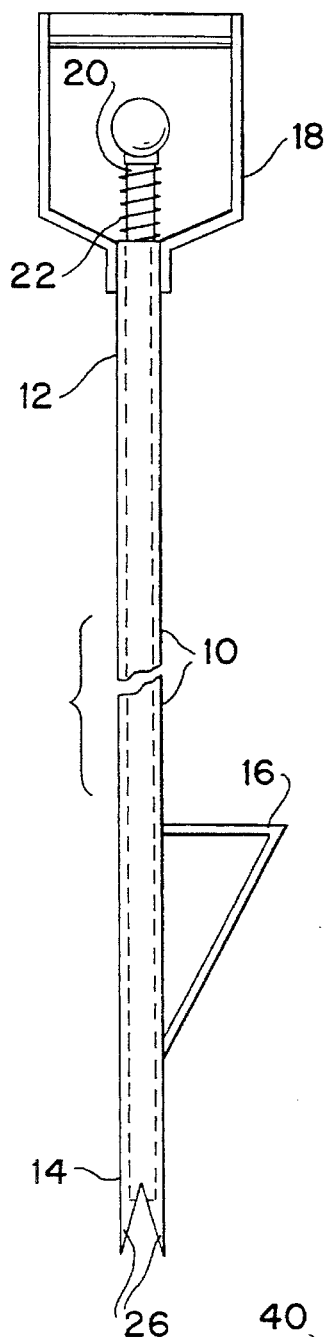
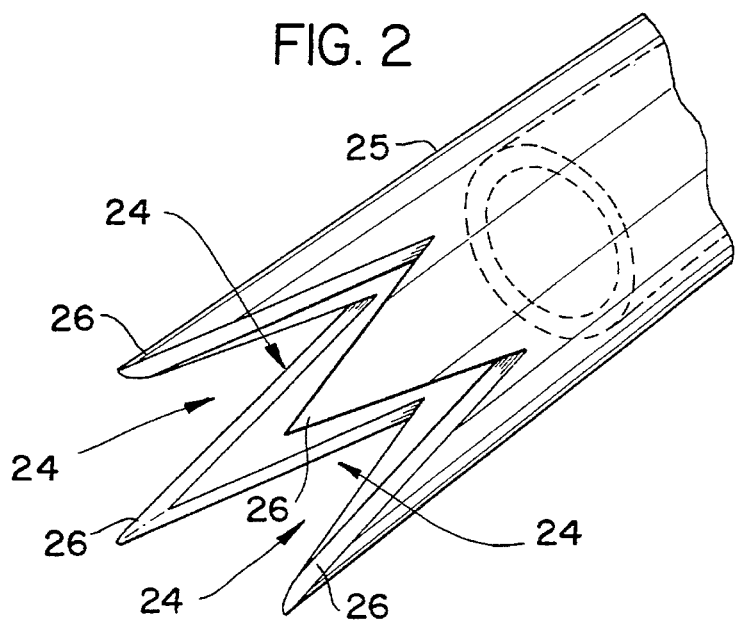
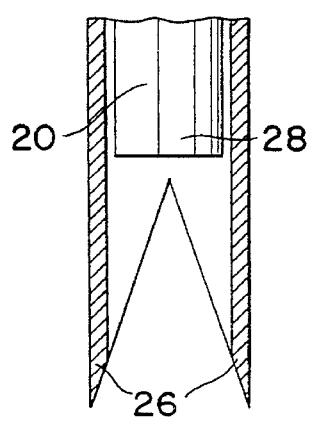
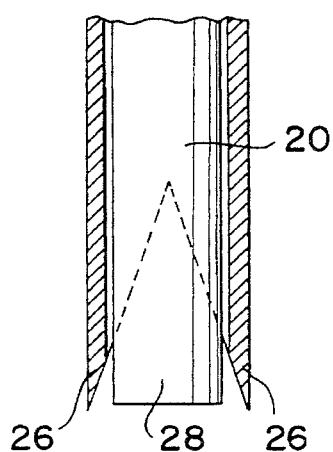
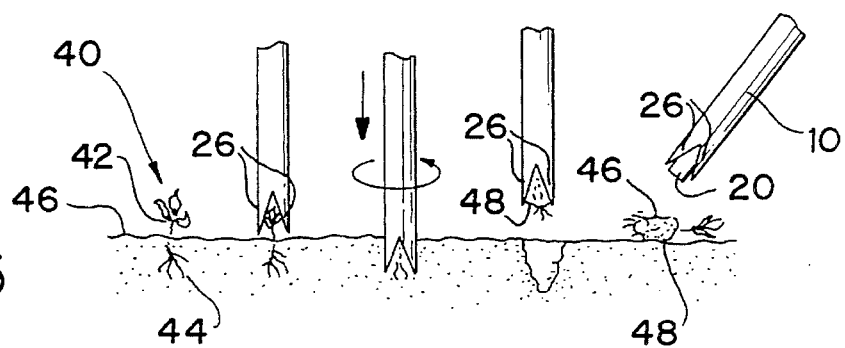

DEVICE FOR EXTRACTING A PLANT FROM THE GROUND

BACKGROUND OF THE INVENTION

This invention relates to a device for extracting a plant, such as a weed, from the ground.

Unwanted plants such as weeds have a tendency to grow very quickly on grass lawns, flowerbeds and the like. Typically, such weeds are cut at their stems by lawnmowers or manual cutters. This does not damage the root system of the weed and the weeds can therefore grow back very quickly from their already established root system. Spades and other hand held instruments have been used in the past in an attempt to dig out the root system of the weeds but these methods have not been found to effectively remove the root system and moreover have been found to be cumbersome and time consuming.

SUMMARY OF THE INVENTION

According to the invention there is provided a device for extracting a plant from the ground, the device comprising at least two opposed prongs, each prong tapering operatively downwardly, the tapered prongs being shaped and configured with respect to one another to in use pierce the ground and grip a plug of earth in which the plant is located between the tapered prongs and handle means for moving the tapered prongs relative to the ground.

Preferably, the tapered prongs are defined by a rigid tube having substantially inverted "V"-shaped cut-outs formed at an end thereof. The tube may be substantially square or circular in cross-section. Typically, four inverted "V"-shaped cut-outs are formed at the end of the tube thereby defining four tapered prongs. In a preferred embodiment, the tube is substantially square in cross-section and an inverted "V"-shaped cut-out is formed in each side of the tube at an end thereof thereby defining a tapered prong at each corner of the tube.

Typically, the handle means comprises a shaft having an operatively upper end and an operatively lower end, the tapered prongs being located at the operatively lower end of the shaft and a holding formation being located at the operatively upper end of the shaft for being gripped by a person's hands. The shaft of the handle means may also have a footrest located at a suitable position on the shaft for the application of a person's foot thereon. The shaft may be a tubular shaft, the tubular shaft being an integral extension of the tube forming the tapered prongs.

Conveniently, the device may have a dispensing means for removing the plug of earth which has been removed from the ground from between the tapered prongs. The dispensing means may be a rod extending through the tubular shaft described above which is movable operatively downwardly to project between the tapered prongs to in use remove the plug of earth which has been removed from the ground between the tapered prongs. Typically, the rod is mounted on the tubular shaft for movement between a rest position in which the operatively lower end of the rod is above the tapered prongs and a dispensing position in which the operatively lower end of the rod is between the tapered prongs and wherein urging means is provided to urge the rod towards the rest position. The urging means may be a coil spring located around the rod and acting between the rod and the tubular shaft. The rod may be a tubular rod and may for example be made of polymeric plastic material, such as PVC.

Typically the shaft and prongs are made from a rigid metal material.

In a preferred embodiment of the invention, a device for extracting a plant from the ground comprises:

- a tubular shaft having a square cross-section and having an operatively upper end and an operatively lower end;
- a holding formation formed on the operatively upper end for being gripped by a person's hands;
- a footrest suitably located on the shaft for the application of a person's foot thereon;
- an inverted "V"-shaped cut-out formed in each side of the operatively lower end of the tubular shaft thereby defining a tapered prong at each corner of the operatively lower end of the shaft;
- a rod mounted in the shaft for movement between a rest position in which the operatively lower end of the rod is above the tapered prongs and a dispensing position in which the operatively lower end of the rod is between the tapered prongs; and
- urging means for urging the rod into the rest position.

BRIEF DESCRIPTION OF THE DRAWINGS

The invention will now be described in more detail, by way of example only, with reference to the accompanying drawings in which:

FIG. 1 shows a side view of a device according to the invention;

FIG. 2 shows a detail of the prongs of the device of FIG. 1;

FIG. 3 shows a sectional view of the operatively lower end of the shaft of the device of FIG. 1 having a dispensing rod in a rest position;

FIG. 4 shows a sectional view of the operatively lower end of the shaft of the device of FIG. 3 wherein the dispensing rod is in a dispensing position; and FIG. 5 shows the operation of the device of FIG. 1.

DESCRIPTION OF AN EMBODIMENT

FIG. 1 shows a side view of a device according to the invention. The device has handle means which comprise a tubular shaft 10 having an operatively upper end 12 and an operatively lower end 14, a footrest 16, and a holding formation 18. A dispensing rod 20 and a coil spring 22 is also shown. The device also has tapered prongs 26, each prong 26 tapering operatively downwardly.

The tubular shaft is square in cross-section and is made from a rigid metal such as mild steel. The footrest 16 is located at a suitable position on the tubular shaft 10 so that a person's foot may be applied thereto to bring the force of the person's weight to bear downwardly on the tubular shaft 10. The holding formation 18 is located at the operatively upper end 12 of the tubular shaft 10. The holding formation 18 is suitably shaped for being gripped by a person's hands to operate the device. The dispensing rod 20 is a tube of a polymeric plastic material, such as PVC. The dispensing rod 20 is slidably located inside the tubular shaft 10. One end of the coil spring 22 acts on the rod 20 and the other end of the coil spring 22 acts on the tubular shaft 10.

FIG. 2 shows a detail of the tapered prongs 26 of the device. The tapered prongs 26 are defined by a rigid tube 25, substantially square in cross-section with an inverted "V"-shaped cut-out 24 formed in each side of the tube at an end thereof thereby defining a tapered prong 26 at each corner of the rigid tube 25. In this embodiment, the rigid tube 25 and the tubular shaft 10 are an integrally formed single tube.

FIGS. 3 and 4 show the operation of the dispensing rod 20. The dispensing rod 20 is mounted in the tubular shaft for movement between a rest position shown in FIG. 3 in which the operatively lower end 28 of the dispensing rod 20 is above the tapered prongs 26 and a dispensing position shown in FIG. 4 wherein the operatively lower end 28 of the dispensing rod 20 is located between the tapered prongs 26. The spring 22 urges the dispensing rod 20 towards the rest position.

The device operates as follows. FIG. 5 shows a weed 40 having a stem 42 and roots 44 located in the ground 46. The tubular shaft 10 is located over the stem 42 of the weed 40 so that the prongs 26 locate on the ground 46 around the weed 40. Using the holding formation 18 and the footrest 16 a person forces the prongs 26 to pierce into the ground 46. The footrest 16 is of particular use when the ground 46 is hard. The tapered prongs 26 pierce the ground 46 and locate at a position around the roots 44 of the weed 40. The respective tapering sides of the prongs 26 serve to grip a plug of earth 48 in which the weed 40 is located between them. The shaft 10 is then rotated to loosen the plug of earth 48 and then lifted upwardly to remove the plug of earth in which the weed 40 is located. Any roots 44 of the weed 40 which extend outwardly of the tapered prongs 26 nevertheless tend to wrap themselves around the tapered prongs 26 when the tapered prongs 26 are rotated. The dispensing rod 20 is then pushed downwardly from the rest position to the dispensing position, as shown in FIG. 5, to remove the plug of earth 48 which has been removed from the ground 46 between the tapered prongs 26.

It can be seen that with the device of the invention, the entire weed including the roots are substantially removed from the ground by removing a plug of earth in which the plant is located. In this manner, the same weed cannot grow again. Equally importantly, the device presents an efficient and quick method of removing unwanted plants such as weeds from the ground.

I claim:

1. A device for extracting a plant from the ground, comprising:

at least two opposed prongs, each prong tapering operatively downwardly, the tapered prongs being shaped and configured with respect to one another to, in use, pierce the ground and grip a plug of earth in which the plant is located between the tapered prongs; and handle means for moving the tapered prongs relative to the ground;

wherein the tapered prongs are defined by a rigid tube which is substantially .square in cross-section and has an inverted "V"-shaped cut-out formed in each side of the tube at an end thereof thereby defining a tapered prong at each corner of the tube.

2. A device according to claim 1 wherein the handle means comprises a shaft having an operatively upper end and an operatively lower end, the tapered prongs being located at the operatively lower end of the shaft, and a holding formation being located at the operatively upper end of the shaft for being gripped by a person's hands.

3. A device according to claim 1, wherein the handle means comprises a tubular shaft which is an integral extension of the rigid tube forming the tapered prongs.

4. A device for extracting a plant from the ground, the device comprising:

at least two opposed prongs, each prong tapering operatively downwardly, the tapered prongs being shaped and configured with respect to one another to, in use, pierce the ground and grip a plug of earth in which the plant is located between the tapered prongs;

handle means for moving the tapered prongs relative to the ground; and dispensing means for removing the plug of earth from between the tapered prongs;

wherein the tapered prongs are defined by a rigid tube which is substantially square in cross-section and has an inverted "V"-shaped cut-out formed in each side of the tube at an end thereof thereby defining a tapered prong at each corner of the tube.

5. A device according to claim 4, wherein the dispensing means is a rod extending through the rigid tube, the rod being movable operatively downwardly to project between the tapered prongs for removing the plug of earth from between the tapered prongs.

6. A device for extracting a plant from the ground comprising:

a tubular shaft having a square cross-section and having an operatively upper end and an operatively lower end;

a holding formation formed on the operatively upper end of the tubular shaft for being gripped by a person's hands;

a footrest suitably located on the shaft for the application of a person's foot thereon;

an inverted "V"-shaped cut-out formed in each side of the operatively lower end of the tubular shaft thereby defining a tapered prong at each corner of the operatively lower end of the shaft;

a rod mounted in the shaft for movement between a rest position in which the operatively lower end of the rod is above the tapered prongs and a dispensing position in which the operatively lower end of the rod is between the tapered prongs; and urging means for urging the rod into the rest position.

\* \* \* \* \*